C. A. LATHROP.
FOLDING CAR STEP.
APPLICATION FILED APR. 25, 1910.

981,203.

Patented Jan. 10, 1911.
2 SHEETS—SHEET 1.

Witnesses:
Mary Sholderer
C. B. Bradford

Clinton A. Lathrop, Inventor
per
L. L. Westfall his Attorney.

THE NORRIS PETERS CO., WASHINGTON, D. C.

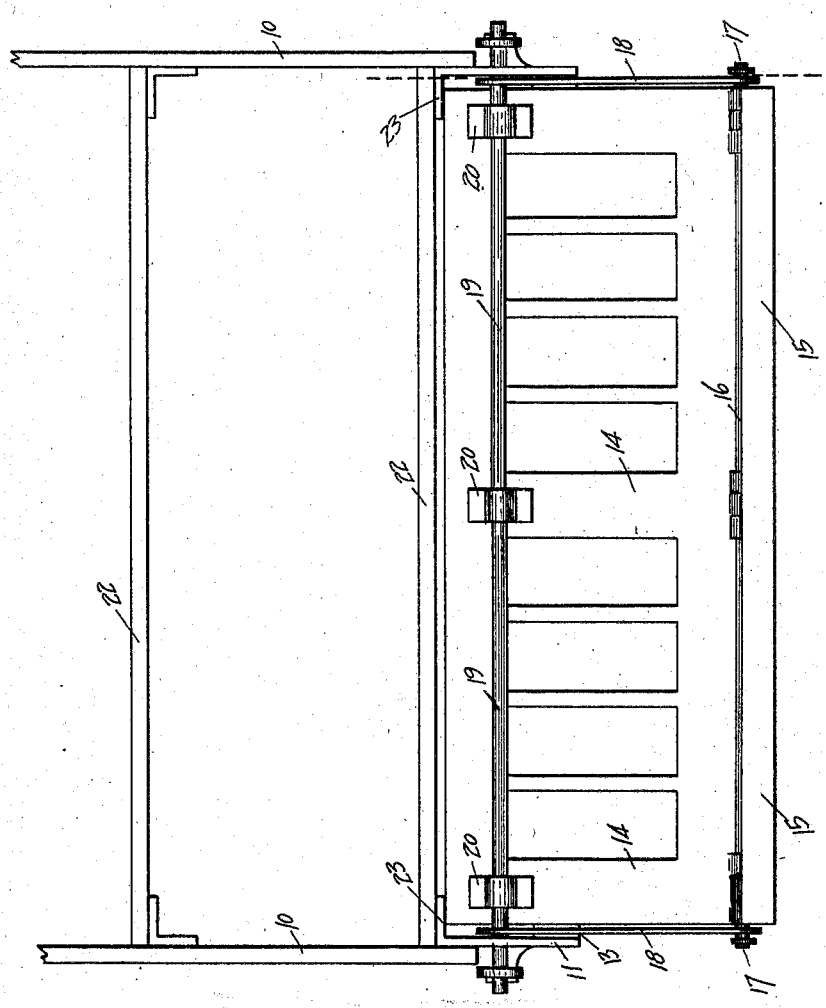

UNITED STATES PATENT OFFICE.

CLINTON A. LATHROP, OF SPOKANE, WASHINGTON, ASSIGNOR OF ONE-HALF TO GEROW KOONS, OF SPOKANE, WASHINGTON.

FOLDING CAR-STEP.

981,203.  Specification of Letters Patent.  Patented Jan. 10, 1911.

Application filed April 25, 1910. Serial No. 557,342.

*To all whom it may concern:*

Be it known that I, CLINTON A. LATHROP, a citizen of the United States, residing at Spokane, in the county of Spokane and State of Washington, have invented certain new and useful Improvements in Folding Car-Steps, of which the following is a specification.

This invention pertains to car steps and has for its object to provide an additional step to be attached to the permanent steps for passengers upon the car.

The purpose is to provide a step that can be attached beneath the permanent steps on the passenger car and be adapted to fold out of the way when not in use and at the same time be easily dropped down to place when required.

A special object is to facilitate mounting and dismounting the permanent car step without the use of a stool.

Figure 1:
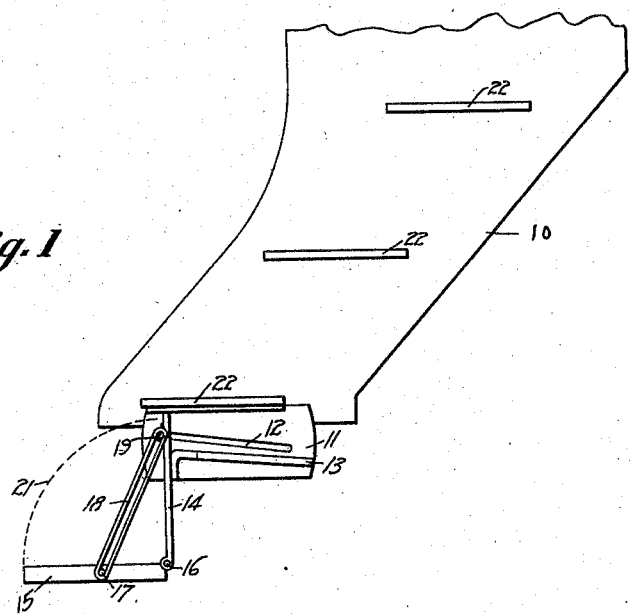
Figure 2:
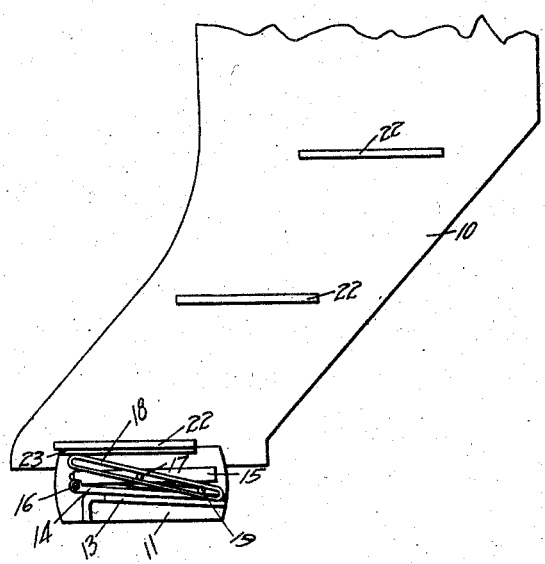

In the drawings, Figure 1, is a broken away side view of a permanent set of car steps with the apparatus attached, in an unfolded position, ready for use, Fig. 2, is a side view of the same with the apparatus folded to a position underneath the permanent car steps, and Fig. 3, is a front view of the same mechanism in an unfolded position and ready for use.

To the bottom of the stiles 10 are secured hangers 11 provided with nearly horizontal oblong slots 12 and tracks 13. The folding step is composed of a back 14 and tread 15, connected together by hinges 16. A pin 17 extends longitudinally through the tread 15 and extends far enough beyond each end of the same to permit of its connecting with the oblong slotted arms 18. A horizontal rod 19 is secured to the upper side of the back 14 of the step by brackets 20, which rod also passes through the upper end of the oblong slotted arms 18 and also through the nearly horizontal slots 12 in the hangers 11.

When the step is down and ready for use as shown in Figs. 1 and 3, the top edge of the back 14 rests against the flanges 23 of the hangers 11. When it is desired to fold the step the tread 15 is elevated upward following the direction of the dotted line 21, the back 14 is lifted upward following the same line and the two parts are then pushed backward underneath the lower permanent step 22, the rod 19 being crowded backward along the oblong slots 12 and the back 14 following the tracks 13 until the apparatus rests in the position shown in Fig. 2.

Having thus described my invention, what I claim as new and useful and desire to secure by Letters Patent is:

A car step consisting of a tread and back, hinged together and suspended from the stiles of the permanent steps of a car, underneath the lower step thereof, oblong slotted arms connected at one end with the ends of the tread at approximately the center thereof and at the other end with a rod attached horizontally to the back of the step and connected with nearly horizontal oblong slots in hangers suspended from the stiles of the permanent steps of a car, together with nearly horizontal tracks secured to said hangers, adapted to receive the ends of the back of the step, substantially as described.

In testimony whereof I affix my signature, in presence of two witnesses.

CLINTON A. LATHROP.

Witnesses:
EARL F. LATHROP,
MARY SHOLDEIER.